March 3, 1970 R. F. CAROSELLI ET AL 3,498,826
TREATED GLASS FIBERS AND FABRICS FORMED THEREOF
Filed March 30, 1966

INVENTORS
Remus F. Caroselli
James J. Dillon
by Staelin and Overman
Att'ys

United States Patent Office 3,498,826
Patented Mar. 3, 1970

3,498,826
TREATED GLASS FIBERS AND FABRICS
FORMED THEREOF
Remus F. Caroselli, Cumberland, and James J. Dillon,
Providence, R.I., assignors to Owens-Corning Fiberglas
Corporation, a corporation of Delaware
Filed Mar. 30, 1966, Ser. No. 538,744
Int. Cl. C03c 25/02
U.S. Cl. 117—72       5 Claims

ABSTRACT OF THE DISCLOSURE

A glass fiber fabric in which the glass fibers are present in the form of bundles of glass fibers provided with a surface treatment to improve the abrasion resistance wherein the glass fibers of the bundle have a first coating of an organo silicon compound and an overcoating of polytetrafluoroethylene particles interbonded with a polyacrylate resin.

---

This invention relates to fabrics of glass fibers characterized by a marked increase in resistance to deterioration by abrasion and it relates more particularly to glass fiber fabrics having improved abrasion resistance and to a method and composition for use in the preparation of same.

Glass fibers are employed extensively in the manufacture of fabrics of high strength, high resistance to wrinkling, good washability, excellent appearance, and in which one or more of the important characteristics is resistance to heat and flammability. One of the barriers to the more widespread usage of glass fibers as a textile material resides in the realtively low abrasion resistance of the glass fibers whereby the fibers fray or break down in response to mutual abrasion or other surface abrasions to which the glass fiber fabric might be exposed in use.

Substantial inroads have been made in overcoming the relatively poor abrasion resistance of the glass fibers and fabrics formed thereof whereby glass fiber fabrics have found increased utilization as a textile material, especially in curtains, draperies, and other applications where fiber resistance, strength, wrinkleproofness and appearance constitute one or more of the factors in the selection of a textile material.

Because of the many outstanding properties of glass fibers as a textile material, extensive research and development has been expended towards the further increase of the abrasion resistance of glass fibers and fabrics formed thereof, such as in the treatment of glass fibers with abrasion resistant finishes, encapsulation of the glass fibers with protective abrasion resistant coating, and the like.

It is an object of this invention to produce and to provide a method for producing glass fibers and fabrics formed thereof having greatly improved resistance to abrasion and in which the improved abrasion resistance is achieved without loss of others of the desirable properties of the glass fibers or fabrics formed thereof.

It is another object of this invention to provide a method and composition for use in the treatment of glass fibers whereby the glass fibers and fabrics formed thereof are highly resistant to deterioration by mutual or other abrasion and it is a related obejct to provide a treatment of the type described which makes use of relatively low cost and readily available materials; which can be applied in a simple and efficient manner during the processing of the fibers and fabrics formed thereof; which does not interfere with the processing of the glass fibers during foramtion of the glass fiber filaments and yarns, cords and fabrics formed thereof; which does not interfere with the fuller utilization of the desirable properties of the glass fibers in the glass fiber fabrics and which results in a glass fiber fabric of high strength, good appearance, long life, and which remains fire resistant.

These and other objetcs and advantages of this invention will hereinafter appear and, for purposes of illustration, but not of limitation, an embodiment of the invention is shown in the accompanying drawing, in which.

Figure 1:
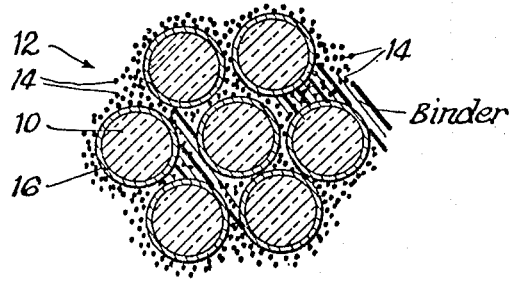
FIG. 1 is an enlarged sectional view across a fragmentary portion of a bundle of glass fibers in a glass fiber fabric treated in accordance with the practice of this invention.

It has been found that the abrasion resistance of glass fibers 10 in fabrics formed thereof can be increased many-fold when the glass fibers in the fabric are separated one from the other in the glass fiber bundle 12 with very fine particles 14 of a solid, organic, polymeric lubricating material which does not function to interbond the adjacent filaments of glass fibers in the glass fiber bundle and provides bearing points having lubricating characteristics which permit relative movements between the filaments and bundles of glass fibers and yet operates to protect the glass fibers during processing and use against destruction or deterioration by abrasion.

The essential characteristics for retention of the fine particles of organic polymeric lubricating material in position of use on the glass fiber surfaces without interbonding of the adjacent filaments of the glass fibers is achieved by a combination of treatments wherein the surfaces of the glass fibers are modified to convert the normally hydrophilic surface to one that is organophilic or hydrophobic after which the fine solid particles of the organic polymeric lubricating materials are introduced and are able to wet the hydrophobic surfaces of the glass fibers and wherein the particles of the organic polymeric lubricating material is formulated for application with a bonding resin that operates to hold the particles in position of use between the fibers and to retain colored pigment when incorporated in the glass fiber finish to impart the desired color to the glass fibers and fabrics formed thereof. Thus there is produced a stabilized system which remains substantially permanently on the glass fiber surfaces to protect the glass fibers and to permit relative movements therebetween as required for effective use of the glass fibers in a fabric formed thereof.

By the described combination of characteristics, it has been possible to increase abrasion resistance as much as 15 to 40 times, as evidenced by tumble abrasion values in comparative tests with glass fibers embodying surface finishes of present composition.

The first treatment to render the glass fiber surfaces organophilic or hydrophobic can be achieved by the treatment of the glass fiber surfaces with an organo silicon compound in the form of an organo silane, its hydrolysis product or polymerization product wherein the silane is represented by the formula $$R_n\text{---}SiX_{(4-n)}$$

in which X is a highly hydrolyzable group such as chlorine or other halogen, ethoxy, methoxy, or other short chained alkoxy group, an amino group and the like highly hydrolyzable groups, R is an organic group in the form of methyl, ethyl, propyl, butyl, or other short or

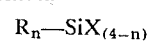

long chain aliphatic group; benzyl, naphthyl, or other aromatic group; tolyl or other alkaryl group; vinyl, allyl, stearyl, or other ethylenically or acetylenically unsaturated group, a heterocyclic group or the like, and $n$ is a whole number of from 1 to 3.

The organo silicon compound should be applied to the glass fiber surfaces in a very dilute solution or dispersion in aqueous medium or in organic solvents, such as in an aqueous composition containing less than 2 percent by weight of the organo silicon compound and preferably an amount within the range of 0.01 to 0.7 percent by weight. It will be sufficient for altering the characteristics of the glass fiber surfaces in the manner described when an amount of organo silicon compound is applied to form a monomolecular layer 16 on the glass fiber surfaces to render the surfaces hydrophobic. For this purpose, it is preferred to make use of a high polymer organo silicon fluid or organo silicon oil of the type commercially available from the Dow Corning Corporation or the General Electric Company.

Treatment of the glass fibers can be achieved by application onto the glass fiber surfaces in forming or by impregnation of the formed glass fiber fabric, preferably after any original size has been removed.

It is desirable to apply the organo silicon onto the bare glass fiber surfaces so that strong anchorage can be achieved between the organo silicon and the groups on the glass fiber surfaces. For this purpose, it is preferred to treat the glass fibers with the organo silicon to coat the glass fibers during forming or else to remove the size originally applied to the glass fiber surfaces in forming after the glass fibers have been processed into yarns, cords or woven fabrics, as by burning the original size by heat treatment at combustion temperature in excess of 1000° F. in an oxidizing atmosphere or by washing the size from the glass fiber surfaces.

Modification of the glass fiber surfaces with the organo silicon compound is followed by treatment to deposit the fine particles of the solid, organic, polymeric lubricating material. For this purpose, use can be made of a stabilized resinous polymer having lubricating properties such as polyeterafluoroethylene (Teflon) reduced to particles of less than 60 mesh and preferably less than 100 mesh. The fine particles of the organic, polymeric lubricating material are applied onto the hydrophobic surfaces of the glass fibers in combination with a resinous binder, such as a polyacrylic acid or ester polymer, such as Rohm & Haas HA-8. The composition may be formulated of the foregoing components alone or in combination with a pigment intended to impart color to the glass fiber fabric. Such compositions can be applied from aqueous dispersions containing from 0.5 to 10 percent by weight of the finely divided particles of polytetrafluoroethylene and 0.1 to 10 percent by weight of binder to provide a coating in which the materials are present in the ratio of 0.5 to 10 parts by weight of the particles of polytetrafluoroethylene to 0.1 to 5 parts by weight of binder.

Any tendency to form a bond between the resinous particles and the binder with the glass fiber surfaces is diminished by the difficulty to wet out, yet attachment is obtained onto the organo-silicon film on the glass fiber surfaces and by encapsulation of the bundles of glass fibers. Thus the dry solids embodied in the composition are retained on the surfaces of the glass fiber filaments where they can operate to separate the glass fibers and to provide lubricated bearings on which the glass fibers can shift relative one to another in the bundle but wherein the glass fiber filaments remain protected against the forces of abrasion to prevent deterioration thereof.

Having described the basic concepts of this invention and the theoretical considerations believed to be involved, illustration will now be made of the practice of this invention.

Example 1

Figure 2:
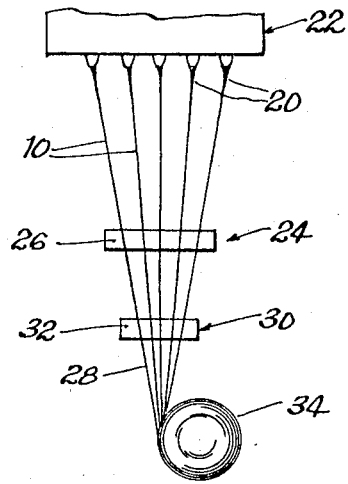
FIG. 2 is a schematic view showing the arrangement of elements for the treatment of the glass fibers in conjunction with the glass fiber forming operation.
Figure 3:
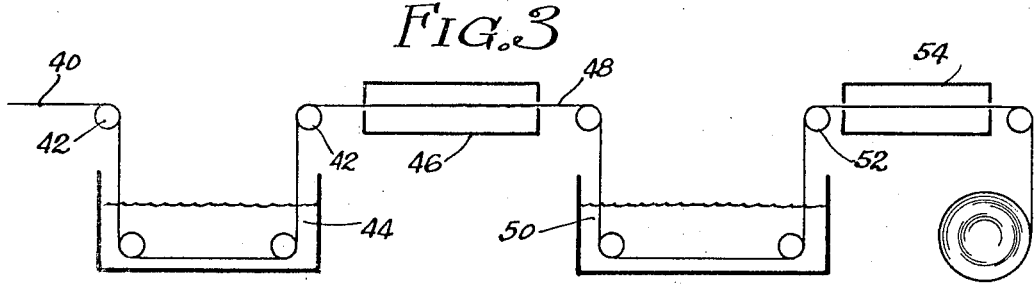
FIG. 3 is a schematic drawing showing the arrangement of elements in the treatment of glass fibers, in accordance with the practice of this invention, after the fibers have been formed into a textile fabric.

In the following example the concepts of this invention are embodied in the treatment of the glass fibers in conjunction with the glass fiber forming operation, as illustrated in FIG. 2.

Continuous glass fiber filaments 10 are formed by rapid attenuation of molten streams of glass 20 issuing from hundreds of orifices in the bottom side of a glass melting furnace 22. In the practice of this invention, the bare surfaces of the formed glass fiber filaments are wet at a first coating station 24 with 1 percent aqueous dispersion of an organo silicon fluid (Syloff 22, a 3% solution). Application to the individual filaments can be made by means of a roller coater 26 schematically illustrated in FIG. 2 in position to engage the glass fiber filaments before they are brought together to form the glass fiber bundle 28. The roller dips into a reservoir of the coating composition whereby the surfaces of the roller become wet for transfer to the filaments as they pass thereover.

After drying, the separated glass fiber filaments are wet at a second coating station 30 with a 2.5 percent by weight dispersion of finely divided particles of Teflon, of less than 100 mesh, and 1.5 percent by weight of a polyacrylic acid polymer (Rohm & Haas HA-8). Application of the second coating composition is made by means of a roller coater 32 or by a wiping pad for application of the coating composition onto the glass fiber surfaces as they are gathered together into a strand and wound upon a rapidly rotating drum 34 which operates to pull the fibers to effect the described attenuation. The treated strands can thereafter be twisted and plied into yarns and woven into fabrics. A clear glass fiber fabric will be produced in the absence of a pigment in the second coating composition but the formed glass will be receptive to coloring or printing with pigment containing compositions or dyestuffs.

Example 2

In the following example, treatment is carried out with fabrics woven of glass fibers in which the glass fibers have previously been sized with a conventional size composition in forming to enable the fibers to be processed into yarns, strands and fabrics but in which the original size has been removed from the fabric by washing or by burning out in response to heating the fabric to a temperature of 1150° F. in an oxidizing atmosphere.

The woven fabric 40 is passed over rollers 42 for immersion into a first bath 44 formulated as a dispersion containing 0.1 percent by weight of methyl ethyl polysiloxane or methyl ethyl phenyl polysiloxane oils of about 1000 molecular weight. The treated fabric is passed through a heated air drying oven 46 at a temperature of about 250–350° F. to remove the diluent and to set the organo silicon on the glass fiber surfaces.

Thereafter, the organo silicon treated glass fiber fabric 48 is impregnated by immersion in a second bath 50 of an aqueous dispersion containing 4 percent by weight Teflon particles of less than 200 mesh and 2 percent by weight of a resinous binder such as Rohm & Haas HA-8, and 3 percent by weight of pigment particles. The impregnated fabric is passed over rollers 52 into a drying oven 54 at a temperature insufficient to cause fusion of the Teflon particles, such as at a temperature of less than 350–400° F.

It will be understood that changes may be made in the details of construction, formulation and application without departing from the spirit of the invention.

We claim:

1. Glass fibers and fabrics formed thereof wherein the glass fibers are present in the fabric in the form of bundles formed of a multiplicity of glass fibers, the improvement which embodies means for enhancing the resistance to deterioration of the glass fibers by abrasion comprising a first coating on the glass fiber surfaces which converts the normally hydrophilic character of the glass fiber surfaces to one that is hydrophobic, and finely divided particles of polytetrafluoroethylene disposed between the fibers in the bundle and a binder securing the particles to the modified glass fiber surfaces, and in which the first coating comprises an organo silicon compound selected from the group consisting of a silane, its hydrolysis product, and its polymerization product wherein the silane has from one to three highly hydrolyzable groups attached to the silicon atom and at least one organic group attached to the silicon atom.

2. Glass fibers and fabrics as claimed in claim 1 in which the particles of polytetrafluoroethylene are of less than 100 mesh.

3. Glass fibers and fabrics as claimed in claim 1 in which the binder is a polyacrylate resin.

4. Glass fibers and fabrics as claimed in claim 1 in which the materials are present in the ratio of .5 to 10 parts by weight of the particles of polytetrafluoroethylene to .1 to 5 parts by weight of binder.

5. Glass fibers and fabrics as claimed in claim 1 which include a pigment powder in combination with the particles of polytetrafluoroethylene and binder.

References Cited

UNITED STATES PATENTS

| | | | |
|---|---|---|---|
| 2,469,625 | 5/1949 | Barry | 1117—72 X |
| 2,688,006 | 8/1954 | Steinman | 117—72 X |
| 2,733,160 | 1/1956 | Iler | 117—126 X |
| 2,754,223 | 7/1956 | Caroselli | 117—126 X |
| Re. 25,622 | 7/1964 | MacMullen et al. | 117—126 |

WILLIAM D. MARTIN, Primary Examiner

D. COHEN, Assistant Examiner

U.S. Cl. X.R.

117—76, 126